United States Patent [19]

Dunstan

[11] 4,116,597
[45] Sep. 26, 1978

[54] APPARATUS FOR FEEDING ELONGATED EXTRUSIONS

[75] Inventor: James M. Dunstan, Kalamazoo, Mich.

[73] Assignee: Acorn Building Components, Inc., Detroit, Mich.

[21] Appl. No.: 709,630

[22] Filed: Jul. 29, 1976

[51] Int. Cl.² .................. B23P 17/00; B23P 19/00
[52] U.S. Cl. .................................... 425/110; 83/5; 83/420; 83/436; 198/624; 425/224; 425/289
[58] Field of Search .................. 118/DIG. 19, 35; 425/110, 224, 289; 83/5, 420, 435, 436; 198/624; 52/309.3

[56] References Cited

U.S. PATENT DOCUMENTS

| Re. 28,084 | 7/1974 | Barker | 425/110 |
| Re. 28,086 | 7/1974 | Holliday et al. | 425/110 |
| 3,204,324 | 9/1965 | Nilsen | 52/309.3 X |

Primary Examiner—John P. McIntosh
Attorney, Agent, or Firm—Cullen, Settle, Sloman & Cantor

[57] ABSTRACT

A feed mechanism for longitudinally moving an elongated member, such as a channel-shaped extrusion and the like, along a support table beneath a filling nozzle or through a cutting apparatus, comprising a pair of opposed E-shaped frames, each having its central leg pivotally connected to the table and each having a vertically axised roller mounted upon the free ends of each of its outer legs. The legs of one frame are axially aligned with the legs of the opposite frame so that the rollers form opposing pairs, with one roller of each pair being power driven. The central legs are formed of a hydraulic cylinder and piston rod so that they are longitudinally adjustable for thereby moving the rollers towards and away from each other for bearing against opposite sides of the elongated member and moving the elongated member longitudinally therebetween.

11 Claims, 14 Drawing Figures

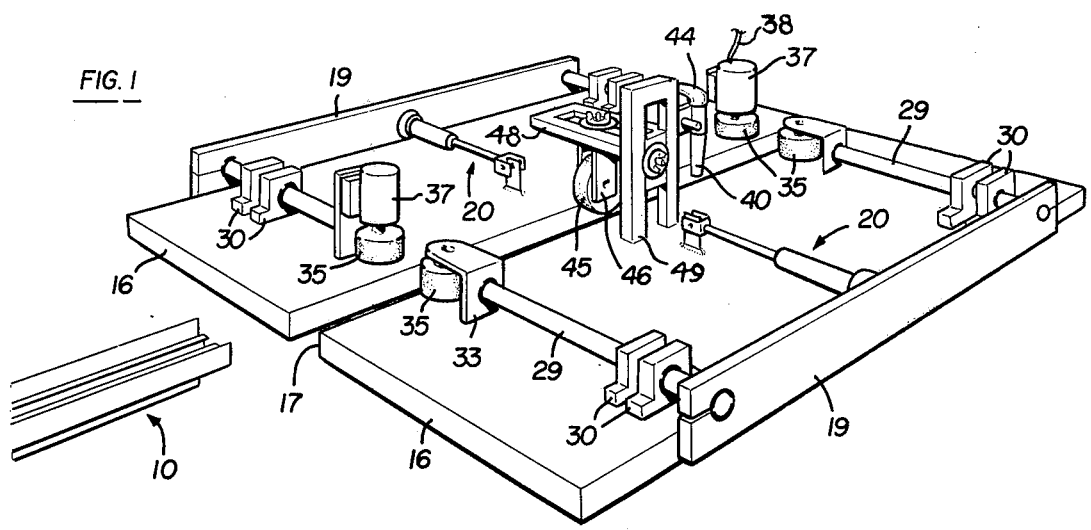
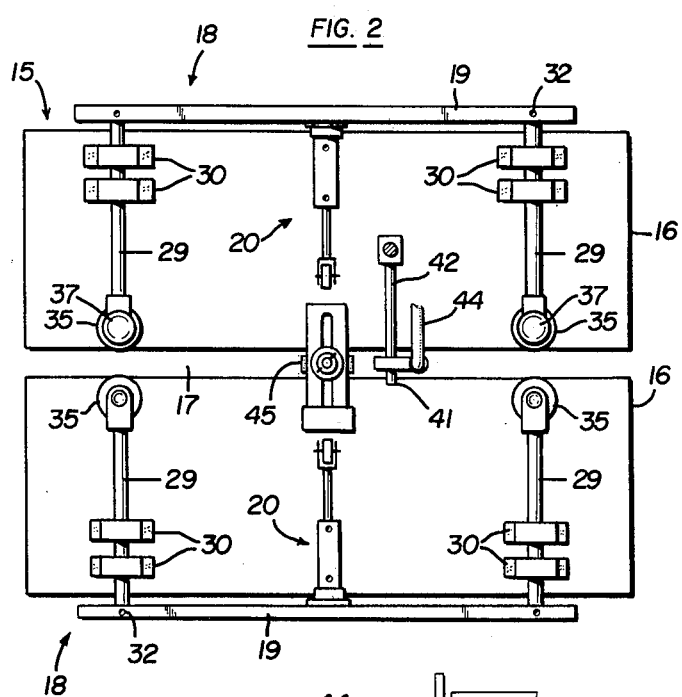
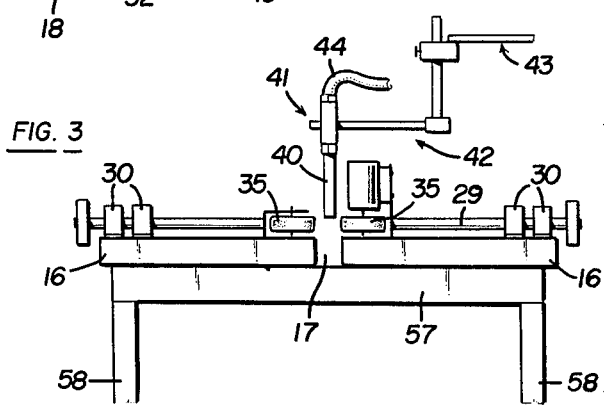
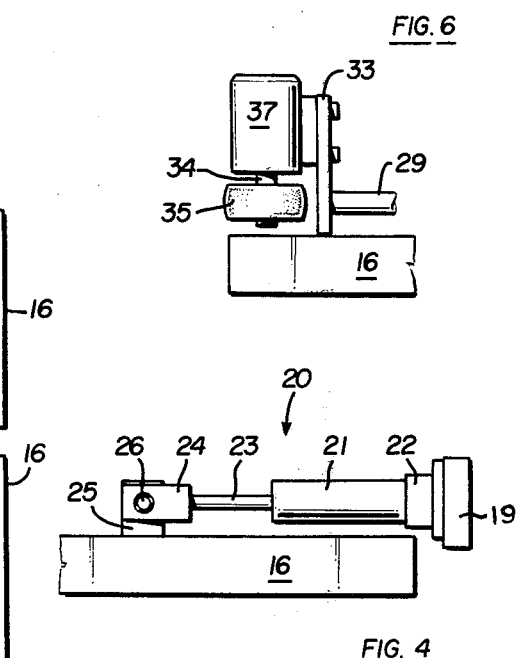
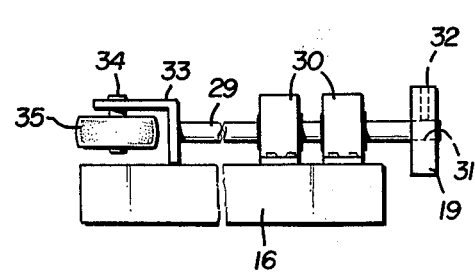

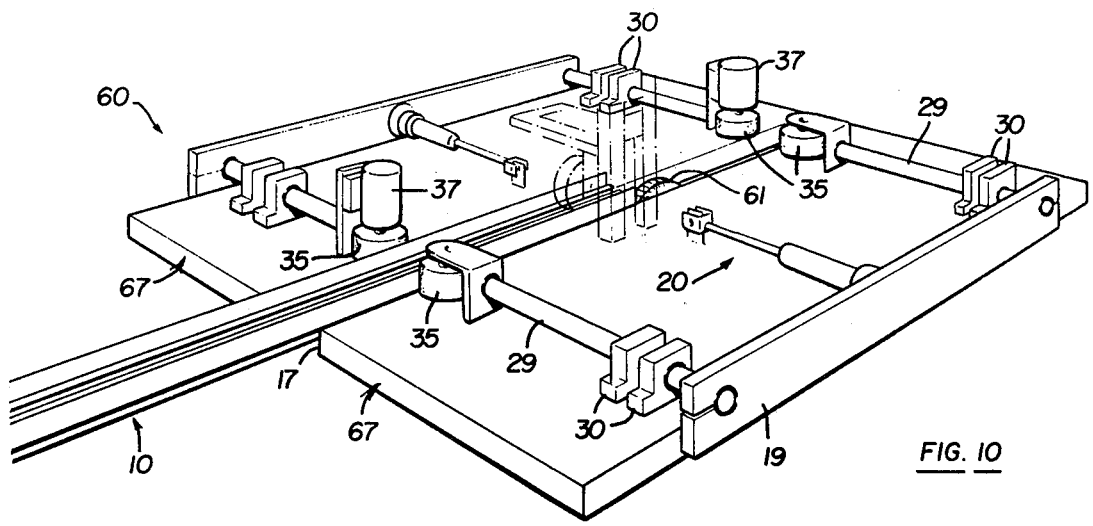
FIG. 10
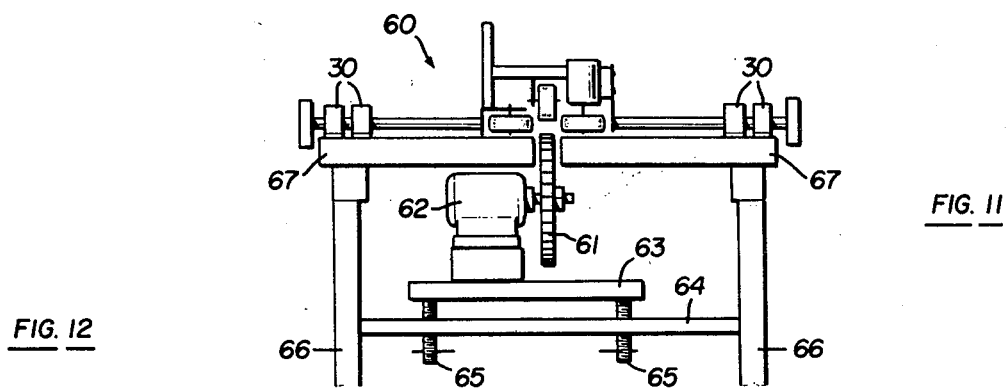
FIG. 11
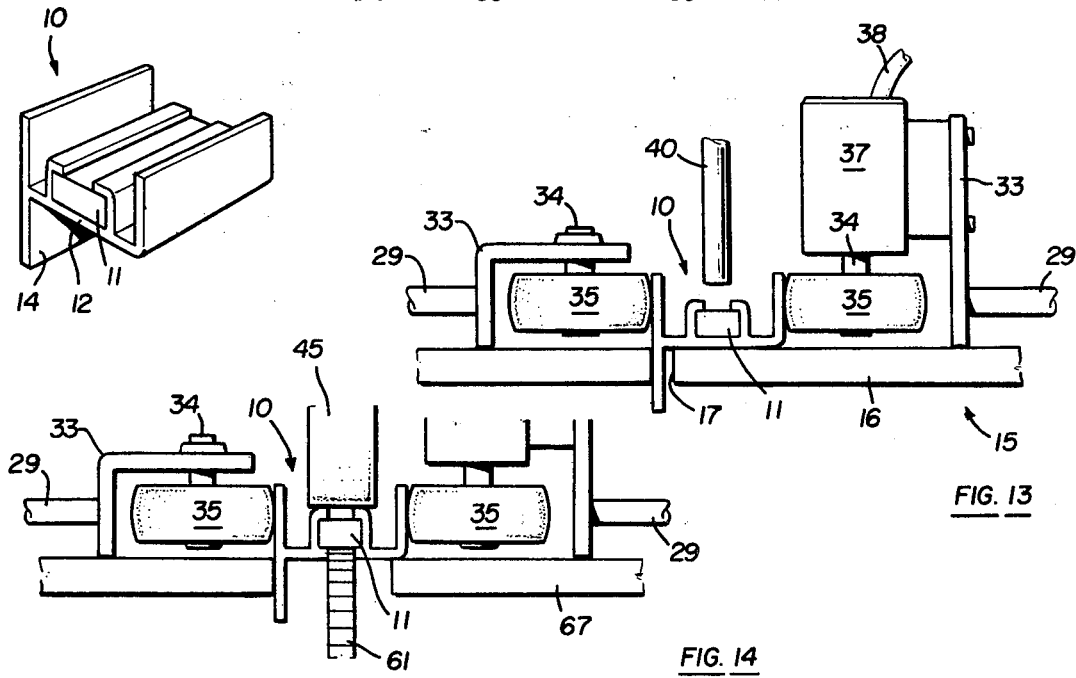
FIG. 12
FIG. 13
FIG. 14

APPARATUS FOR FEEDING ELONGATED EXTRUSIONS

BACKGROUND OF INVENTION

In the manufacture of thermally insulated frames used for doors, windows, etc., it is conventional to form the frame members out of elongated extrusions, such as aluminum extrusions, which are channel-shaped in cross-section or include a channel-shaped portion. Such channels are then filled with a synthetic plastic material which is applied in liquid form and permitted to harden or cure within the channel. Thereafter, the base of the channel is cut away so that the frame element is formed of a metal-plastic-metal composite elongated member. The plastic interposed between the two metal portions serves as a thermal insulator.

In order to apply the plastic to the aluminum extrusion, the extrusion is passed longitudinally beneath a filling nozzle connected to a mixing head and supply source which feeds and mixes together the synthetic resin material, accelerator ingredients, etc., for thereby feeding the plastic, in liquid form, into the channel. One prior piece of equipment for moving the extrusion beneath the feeding or application nozzle comprised a support table along which the extrusion was longitudinally moved by means of a pair of opposed rollers, at least one of which was power driven, for thereby moving the extrusion longitudinally as the rollers rotated. Such apparatus included additional guides configured to bear against and guide the sides of the extrusion so that it could follow the predetermined path of movement beneath the filling nozzle.

The invention herein relates to an improvement to the above-mentioned prior feeding apparatus, which improvement permits more rapid adjustment of the feed mechanism and a better and more positive control of feed as well as simplification of the guide means and provision of a relatively inexpensive apparatus.

SUMMARY OF INVENTION

The invention herein contemplates a feed mechanism for longitudinally feeding an elongated channel-type extrusion or the like either beneath a filling nozzle or above a cutting device, such as a saw. The feed mechanism is generally formed of a support table upon which is positioned a pair of opposed E-shaped frames, with the outer legs of each frame having a roller and the central legs being endwise adjustable and pivotally connected to the support table so that adjustment of the central legs causes the frames to move towards and away from each other. The rollers of one frame are power driven by a suitable hydraulic motor system. The extrusion is thus passed between the opposing rollers of each of the E-shaped frames for being driven longitudinally by the powered rollers. The powered and idler roller pairs are appropriately adjusted towards and away from each other by simply adjusting the central leg of each frame.

In addition, the extrusions may be more closely guided between the opposing rollers by means of a simplified guide formed of a heavy metal plate having wheels such as roller skate wheels, mounted along one edge for contacting the extrusions, and screw-forming pads on the opposite ends for engaging the back bar of its adjacent E-shaped frame, with the plate rested loosely upon the table. Thus, the simplified guide may be easily positioned, as desired, between the moving extrusion and the frame back, relying only upon its own weight for keeping it in place. This considerably simplifies and reduces the cost of any necessary guide means, as compared to prior types of guides used for this general purpose.

The overall objective of the feed apparatus herein is to provide a simplified, inexpensive, system for easily feeding extrusions and similar members in such a manner as to avoid damaging them and yet to maintain desired speeds of feed with relatively little manual labor.

These and other objects and advantages of this invention will become apparent upon reading the following description, of which the attached drawings form a part.

DESCRIPTION OF DRAWINGS

FIG. 1 is a perspective view of the feed apparatus herein.

FIG. 2 is a top plan view of the feed apparatus, and

FIG. 3 is an end view taken in the direction of arrows 3—3 of FIG. 2.

FIG. 4 is an enlarged elevational view showing the frame central leg connection, and FIG. 5 is an enlarged elevational view showing one outer leg of the frame.

FIG. 6 is an enlarged elevational view showing a power driven roller.

FIG. 10 is a perspective view of the feed mechanism utilized as part of a saw cutter.

FIG. 11 is an end elevational view of the saw-cutter of FIG. 10.

FIG. 12 is a perspective view of a sample channel-shaped extrusion.

FIG. 13 shows an enlarged end view of part of the feed apparatus, showing the extrusion being filled with the resinous filler material, and FIG. 14 is an enlarged end view of part of the saw cutter, showing the base of the channel being removed to provide a thermal barrier frame element.

DETAILED DESCRIPTION

Figure 7:
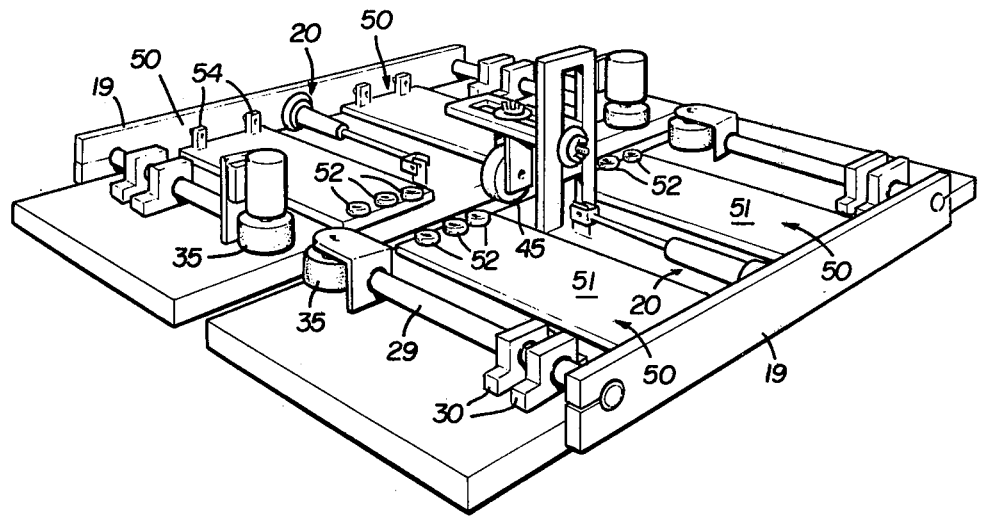
FIG. 7 is a perspective view of the feed apparatus, with certain parts omitted for illustration purposes, and illustrating the guide members located upon the support table.

The feed mechanism herein is for the purpose of longitudinally moving, at a relatively uniform speed, an elongated member such as a channel-type aluminum extrusion. By way of example, FIG. 12 is a perspective illustration of the general type of aluminum extrusion referred to herein. As seen in the illustration, such extrusion 10 is provided with a channel portion, having a channel base 12. Such extrusion, which is to be used to form a thermal barrier type of frame element for a window or door or the like, includes a plastic or synthetic resinous filler 11 which is applied to the channel in liquid form and permitted to harden or cure therein (see FIG. 13.) Once hardened, the channel base 12 is removed to provide the metal-plastic-metal joint or composite element illustrated in FIG. 14. The plastic, being a poor heat conductor, acts as a thermal barrier between the two opposite metal portions of the element. Such element may also include a flange or fin 14.

The cross-sectional shapes of such extrusions vary considerably, depending upon the particular window, door, frame, etc., for which they are designed. But, essentially, the elements, regardless of how shaped, are as set forth above. In addition, the overall member is of substantially uniform cross-section throughout its length.

Turning now to the feeding mechanism for feeding such an extrusion beneath a plastic filling head or nozzle or over a cutting mechanism for removing the base of the channel:

The apparatus includes a table-like support surface 15, preferably formed of a pair of plates 16 arranged edge to edge to form a space or slot 17 between them, which slot will receive the fin or flange 14 of an extrusion. The slot and the adjacent plate areas defining the slot form a longitudinal feed area extending from the forward to the rear end of the table.

A pair of opposing E-shaped frames 18 are arranged on either side of the table. Each frame includes a back bar 19 arranged longitudinally of the slot at the edge of the table.

Each frame also includes an adjustable center leg 20 (see FIG. 4) preferably formed of an hydraulic cylinder 21 fixedly connected into a socket or collar 22 fastened to its adjacent back bar 19. A piston rod 23 extends outwardly of the cylinder and is movable inwardly or outwardly of the cylinder by the application of hydraulic pressure, in the conventional manner. A clevis 24 connects the free end of the piston rod, by means of a pin 26 to a bracket 25 fastened to the table. The hydraulic cylinders 21 are connected by conventional fluid lines to a conventional pump or pressurized fluid source, through suitable controls, all of which is not shown, since they are known.

The outer legs 29 of the E-shaped frames are each formed of a shaft journalled through journal bearings 30 fastened to the table. The outer end of each shaft or leg extends through a hole 31 in the back bar and is secured thereto by a suitable mechanical means, such as a set screw 32.

Connected upon the inner or free end of each leg is a bracket 33 which rests upon the table. A vertical shaft 34 extending downwardly from the upper leg of each bracket carries a roller 35. Each roller is preferably formed of a rubber or synthetic rubber, i.e., neoprene, coated metal core which is vertically axised. Each roller is arranged slightly above the table surface because the lower edge of its bracket loosely rests upon the surface and is of sufficient height to space the roller slightly above such surface.

One of the frames has its rollers power driven by means of a separate hydraulic motor 37 mounted upon each of the roller brackets. Each such motor is connected through a hydraulic line 38 to a suitable pump and fluid source (not shown). Preferably, the motors are connected together in series so tht they operate at the same speed. The hydraulic motors and systems for applying hydraulic fluid, are all conventional and therefore are not illustrated here. However, it can be seen that the rollers of one frame are each power driven and are opposed by the opposite rollers of the other frame, which thus act as idlers so that the extrusion is contacted between each pair of power-idler rollers for movement longitudinally of the table.

A conventional filling nozzle 40 is arranged above the feed area of the table and is supported by a suitable clamp 41 connecting it to a horizontal rod 42 which in turn is fastened to a stand 43. The stand and clamp arrangement is so constructed as to permit the nozzle to be adjusted vertically up and down and also sideways for properly positioning it above the extrusion. The nozzle is connected by means of a hose 44 to a conventional mixing head, pump, and to containers of the liquid resin, accelerator and other chemical ingredients needed to provide a liquid filler which solidifies in place after application into the extrusion channels. This is all conventional and since it forms no part of the invention herein is omitted other than schematically as shown in FIG. 1.

A top roller 45 is arranged above the feed area so as to hold the extrusion down against the support. The roller is mounted within a U-shaped bracket 46 which is adjustably connected to a horizontal support leg 48 that is vertically adjustably connected to a vertical support leg 49.

In operation, an extrusion, such as that exemplified in FIGS. 12–14, is first positioned upon the feed area of the table and by means of operating the hydraulic system of the hydraulic cylinders 21, the frames are adjusted towards and away from each other to properly position the rollers in engaging positions on opposite sides of the extrusions. Thereafter, the hydraulic motors 37 can be continuously operated and a workman can feed extrusions from the forward end of the table towards the rear end so that the extrusions are continuously moved beneath the filling nozzle 40. The extrusions may be of a number of feet in length so that each time an extrusion passes through the feed mechanism, the workman starts a new unfilled extrusion at the forward end of the table. Preferably, the apparatus would include a conveyor, e.g., a roller conveyor, at each of the ends of the table for delivering unfilled extrusions to the feed mechanism and for carrying away the filled extrusions.

The filled extrusions, after being carried off by the remover conveyor (not shown) may be appropriately stored until the plastic solidifies. Thereafter, they may be passed through a sawing mechanism for removing the bases 12 of each channel in a manner to be described below.

Figure 8:
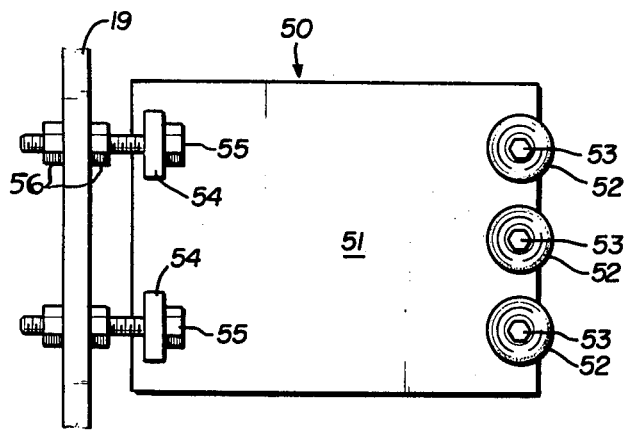
FIG. 8 is a top plan view of one of the guide members.
Figure 9:
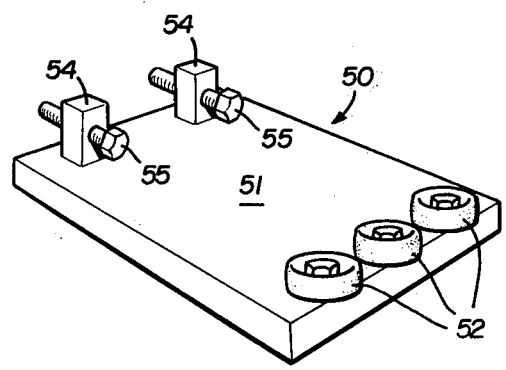
FIG. 9 is a perspective view of a guide member, per se.

In order to better guide the extrusions as they pass between the rollers and particularly to prevent an extrusion from wandering transversely off its longitudinal course so as to bump against the rollers near the rear end of the table, a simplified guide system is provided. Each guide 50 is formed of a heavy, flat metal plate 51 of substantial weight. Several conventional roller skate wheels 52 are mounted by vertical axles or shafts 53 upon one end of the plate. The opposite end is provided with a pair of bosses or raised portions 54 through which bolts 55 are passed. Thus, the plates are rested upon the table, with their bolts forming feet or pads that are either loosely abutted against (see FIG. 7) or alternatively pass through and are held by nuts 56 upon (see FIG. 8) the adjacent back bar 19 of the E-shaped frame. Meanwhile, their wheels are arranged along the path of movement of the extrusions. The wheels may contact the extrusions continuously or may be spaced slightly off the path of movement of the extrusions so that only where the extrusion begins to wander off its path does it contact the wheels for then being guided along its proper path.

The guides are simply loosely rested upon the table, essentially depending upon their weight to keep them in place and upon the bolt forming pads to appropriately position them. By way of example, the guide may be formed of a steel plate of roughly ⅜" thickness and about 1 foot long by 6 inches wide, with three roller skate wheels secured thereon.

The support plates which make up the support table, may be mounted upon an appropriate frame 57 mounted upon table type legs 58. The legs may be either of a fixed length or may be formed of a telescoping arrangement so as to be height adjustable. The specific construction for forming the table frame and legs may be of any conventional type and thus is not illustrated in detail here.

The feed mechanism described above may be used for feeding the extrusion through a saw or cutter apparatus for removing the channel bases 12. Thus, turning to FIGS. 10 and 11, a table-type saw set-up 60 is illustrated which comprises a rotary, circular saw blade 61. The saw blade is mounted upon the shaft of a motor 62 fastened to an adjustable platform 63 carried by a cross-frame bar 64 and mounted thereon by vertically adjustable jack screws 65. The cross bar extends between table legs 66 which support a slotted table top 67 formed of support plates 16 like those of FIG. 1. The plates may be fixedly secured or alternatively, may be movably secured upon the legs so as to permit adjustment of the width of the slot 17.

In operation, the filled extrusion may be fed between the adjacent rollers, held down by the top roller, and as it passes over the circular saw blade 12 its base 12 will be cut away. By appropriately adjusting the depth of the cut, the metal can be removed, without disturbing the plastic filling so as to provide the finished metal-plastic-metal joint.

Having fully described an operative embodiment of this invention, I now claim:

1. Apparatus for longitudinally feeding substantially uniform cross-section elongated members, such as extrusions and the like, comprising:
    a horizontal table-like support surface having opposite sides and an elongated longitudinal feed area extending from a forward end to a rear end of the support surface between the sides thereof;
    a pair of opposed adjustable feed means located at opposite sides of the feed area for cooperatively feeding such member longitudinally along said feed area, with each said feed means being formed of an E-shaped frame whose back is formed of an elongated bar arranged at its adjacent support surface side, approximately parallel to the feed area and whose central leg is secured at one end to the bar, and at its opposite end is pivotally fastened to the surface and whose end legs are spaced from the center leg and extend transversely towards said feed area, with vertically axised rollers rotatably mounted upon the inner end of each of said end legs, i.e., adjacent the feet area;
    and the legs of each frame being axially aligned with the corresponding legs of the other frame transversely of the support surface;
    each of said central legs being selectively adjustable in length for thereby moving the respective rollers transversely towards and away from the feed area for thereby engaging an elongated member to be fed, between the opposing rollers of corresponding end legs;
    and power means for rotating at least some of said rollers for thereby feeding elongated members longitudinally of the support surfaces along the feed area.

2. Apparatus as defined in claim 1 above, and including each of said frame end legs being formed of a shaft which is journalled through a bearing member fixedly mounted upon said support surface, whereby said shafts may move axially in a direction transverse to the support surface for thereby moving the opposing rollers closer together or further apart.

3. Apparatus as defined in claim 2 above, and said central legs each being formed of a hydraulic cylinder and piston rod movable lengthwise inwardly and outwardly of the hydraulic cylinder for adjusting the length of the central leg.

4. Apparatus as defined in claim 1 above, and said power means including each of the end legs of one of said frames having a separate motor mounted upon the inner end thereof and drivingly connected to the roller supported thereon, with the opposing rollers of the opposite frame being freely rotatable for engaging and moving elongated members between opposing pairs of power driven and idler rollers, from the forward to the rear end of the support surface.

5. Apparatus as defined in claim 4, and said motors being of the hydraulically operated type and being connected in series for operating at the same speed.

6. Apparatus as defined in claim 1, and said feed area including a slot formed in and extending from end to end of the support surface, wherein narrow, laterally extending portions of said elongated member, e.g., fins and flanges and the like, may enter into and move longitudinally through said slot, with the elongated member being otherwise supported by the support surface portions defining the edges of said slot.

7. Apparatus as defined in claim 6, and said support surface being formed of a pair of support members which are arranged coplanar, but spaced apart a short distance to provide said slot, with the support members being adjustable towards and away from each other for adjusting the width of the slot.

8. Apparatus as defined in claim 6, and including a horizontally axised power driven rotary saw blade mounted below said support surface and partially extending upwardly into and slightly above the upper surface of said slot so that it may cut away a portion of the elongated member as it is fed along said support surface.

9. Apparatus as defined in claim 1, and including a liquid feed nozzle fixedly mounted above the feed area for feeding a resinous material downwardly into a channel formed in said elongated member, as said elongated member is fed beneath said nozzle.

10. An apparatus as defined in claim 1, and including a horizontally axised roller mounted transversely of and above the feed area, between the pair of opposing end leg rollers and arranged to engage the upper surface of an elongated member for holding said member down against the support surface.

11. An apparatus as defined in claim 1, and including guide members for guiding said elongated member longitudinally along the feed area, said guide members each comprising a heavy plate loosely rested upon the support surface, and having an inner edge adjacent the feed area and an outer edge adjacent a frame bar;
    vertically axised wheels mounted upon said plate adjacent its inner end and with the wheels arranged for engaging side portions of and thereby guiding elongated members;
    and adjustable in length pad members mounted upon the plate at its outer end portion for engaging its adjacent frame bar for thereby adjustably positioning and maintaining the position of the plates between the feed bar and feed area.

* * * * *